United States Patent

Yoshikawa et al.

[11] Patent Number: 5,847,305
[45] Date of Patent: Dec. 8, 1998

[54] REMOTE CONTROL DEVICES FOR ELECTRONIC DEVICES

[75] Inventors: Naoe Yoshikawa, Hachioji; Yasuo Kuroki, Ome, both of Japan

[73] Assignee: Casio Computer Co., Ltd., Tokyo, Japan

[21] Appl. No.: 788,359

[22] Filed: Jan. 24, 1997

Related U.S. Application Data

[63] Continuation of Ser. No. 356,108, Dec. 15, 1994, abandoned.

[30] Foreign Application Priority Data

Dec. 21, 1993 [JP] Japan .................................. 5-346408
Dec. 21, 1993 [JP] Japan .................................. 5-348048

[51] Int. Cl.$^6$ .............................. G10H 1/18; G10H 1/36
[52] U.S. Cl. ............................... 84/634; 84/602; 84/604; 84/610; 340/825.72
[58] Field of Search .................... 84/601, 602, 609–615, 84/634–638, 650–653, 604–606; 340/825.69, 825.72

[56] References Cited

U.S. PATENT DOCUMENTS

| | | | |
|---|---|---|---|
| 4,063,410 | 12/1977 | Welling | 58/38 R |
| 5,214,792 | 5/1993 | Alwadish | 455/45 |
| 5,245,600 | 9/1993 | Yamauchi et al. | 369/49 |
| 5,608,389 | 3/1997 | Matsuzawa | 340/825.57 |

FOREIGN PATENT DOCUMENTS

A-0 330 271  8/1989  European Pat. Off. .
A-0 509 766  10/1992  European Pat. Off. .
WO- A- 94
   03017  2/1994  WIPO .

OTHER PUBLICATIONS

Patent Abstracts of Japan, vol. 17, No. 387 (P–1576) Jul. 20, 1993 & JP–A–05–062 436 (Casio) Mar. 12, 1993 "Abstract") .

*Primary Examiner*—WIlliam M. Shoop, Jr.
*Assistant Examiner*—Marlon T. Fletcher
*Attorney, Agent, or Firm*—Frishauf, Holtz, Goodman, Langer & Chick

[57] ABSTRACT

A remote control device for an electronic device includes a first storage device for storing a plurality of remote control data for controlling an object remotely, a first selection device for selecting respective remote control data from among the plurality of remote control data stored in the first storage device, and an output device for transmitting the respective remote control data selected by the first selection device toward a remote control receiver of the controlled object. A second storage device is provided for storing frequency data on the frequency of transmission of each remote control data output by the output device, and a data updating device is provided for incrementing the respective frequency data stored in the second storage device responsive to the output device transmitting remote control data. A second selection device responsive to a manual operation key is provided for selecting respective remote control data stored in the first storage device in decreasing order of corresponding frequency data stored in the second storage device, and the output device transmits the respective remote control data selected by the second selection device toward the remote control receiver of the controlled object.

9 Claims, 11 Drawing Sheets

- MUSIC NAME
- MEMORY NO.
- RECORDED ORCHESTRAL ACCOMPANIMENT CODE

FIG.6

TOTAL OF FREQUENCIES OF TRANSMISSION OF RESPECTIVE RECORDED ORCHESTRAL ACCOMPANIMENT CODE DATA (TOTAL OF FREQUENCIES OF SONG SINGING) IN ANY PARTICULAR PERIOD

TOTAL OF FREQUENCIES OF TRANSMISSION OF RESPECTIVE RECORDED ORCHESTRAL ACCOMPANIMENT CODE DATA (TOTAL OF TRANSMISSION OF FREQUENCIES OF SONG SINGING)

FIG.7

- MUSIC NAME
- MEMORY NUMBER
- FREQUENCY OF TRANSMISSION OF A PIECE OF MUSIC WITH MEMORY NO.1 (FREQUENCY OF SINGING OF A SONG FOR A PIECE OF MUSIC WITH MEMORY NO.1)
- RECORDED ORCHESTRAL ACCOMPANIMENT CODE

REMOTE CONTROL DEVICES FOR ELECTRONIC DEVICES

This is a continuation of application Ser. No. 08/356,108, failed Dec. 15, 1994 now abandoned.

BACKGROUND OF THE INVENTION

1. Field of the Invention

The present invention relates remote control devices for electronic devices, and more particularly to a transmitter of a remote control device which selects a piece of music in a recorded orchestral accompaniment remotely or which performs various operations in an electronic device.

2. Description of the Prior Art

Recently, electronic devices such as television sets and video tape recorders each have a remote control device annexed thereto such that the user can operate the main function of an electronic device from far away, using such remote control device.

Remote control devices have come into wide use not only in video devices such as television sets and video tape recorders, but also in business and household recorded orchestral accompaniment systems for selection of one of pieces of music. In the remote control devices for selection of one of pieces of music, a music selection code data item coded beforehand with alphabets and numerals beforehand is keyed in by alphanumeric keys of a key-in unit of the remote control device and transmitted toward a remote control receiver provided in the body of the recorded orchestral accompaniment system. The remote control receiver which has received music selection code data is controlled such that it performs a piece of music designated by the body of the recorded orchestral accompaniment system on the basis of the received music selection code data.

However, the music selection remote control device used in the conventional business and household recorded orchestral accompaniment systems only keys in music selection code data with alphanumerical keys and sends the data to the body of the recorded orchestral accompaniment system body, so that they have the following problems.

Each time the user selects a piece of music, using the music selection remote control device, he is required to key in the music selection code data, so that operability is low. Since the remote control device has not stored a history of music selection in the past, it cannot select a popular piece of music easily—it is insufficient in the serving function of satisfying user's interests.

Conventionally, electronic devices such as television sets and video tape recorders each have a so-called "genuine" remote control device dedicated thereto whereas remote control devices sharable by electronic devices of different makers and different kinds have been proposed as learning remote control devices, each of which receives and stores a remote control code from a genuine remote control device, transmits the stored remote code in accordance with a key-in operation so as to be usable in different electronic devices.

Some learning remote control devices each are capable of storing remote control codes for a plurality of electronic devices at the same time. In this case, genuine remote control devices annexed to those electronic devices can be replaced with a single learning remote control device. Those learning remote control devices are provided with various input switches shared with device selection switches which select the respective electronic devices which store the corresponding remote control codes such that when the selection switch selects an electronic device, remote control codes for that selected electronic device is read out and a remote control code corresponding to the operations of the input switches are transmitted.

However, in the learning remote control device which stores remote control codes for the plurality of conventional electronic devices, the device selection switches select an electronic device which operates in a mode and then operate the various input switches, so that if there are electronic devices usually used very frequently, selection of one of those electronic device is troublesome for the user and hence operability is low, undesirably.

As described above, the conventional remote control devices each, for example, only select and send remote control data to control the selection of a piece of music and a plurality of controlled objects such as electronic devices. Thus, pieces of music selected very frequently in the recorded orchestral accompaniment system cannot be selected easily and hence considerable time is taken disadvantageously for selection of an electronic device to be controlled by a learning control device which is capable of controlling different kinds of electronic devices.

SUMMARY OF THE INVENTION

It is therefore an object of the present invention to provide a remote control device for electronic devices which is capable of preferentially selecting a controlled object to be selected frequently to thereby facilitate selection/operation of that controlled object.

It is another object of the present invention to provide a remote control device for a recorded orchestral accompaniment which is convenient to use to thereby easily permit selection of a popular piece of music.

It is a further object of the present invention to provide a remote control device which provides information on the frequency of song singing for each of pieces of music in a recorded orchestral accompaniment device to thereby render the training of the song singing convenient in the recorded orchestral accompaniment device.

It is a still further object of the present invention to provide a learning remote control device which is convenient to use and capable of easily selecting a one used very frequently from among electronic devices having a plurality of functions.

In order to achieve the above objects, the present invention provides a remote control device for an electronic device, including:

first storage means for storing a plurality of remote control data to control a controlled object remotely;

selection means for selecting a particular item from among the plurality of remote control data stored in the first storage means;

output means for transmitting the particular item selected by the selection means toward a remote control receiver of the controlled object;

second storage means for storing data on the frequencies of transmission of the remote control data by the output means in correspondence to the respective remote control data stored in the first storage means; and retrieval means for retrieving the plurality of remote control data stored in the first storage means on the basis of the data on the frequencies of transmission of the remote control data stored in the second storage means when the selection means selects the particular remote control data item.

According to this arrangement, data on the frequency of transmission of each of a plurality of remote control data stored in the first storage means is stored in the second storage means. The retrieval means retrieves the plurality of remote control data on the basis of the data on the frequencies of transmission of the plurality of remote control data. The selection means selects a particular item of the remote control data in accordance with the result of the retrieval. Thus, a controlled object selected frequently is selected preferentially to facilitate the selection/operation of the controlled object.

In order to achieve the above objects, the present invention provides a remote control device for a recorded orchestral accompaniment device, including:

first storage means for storing a plurality of music name data for pieces of music performed by a recorded orchestral accompaniment device and the corresponding plurality of recorded orchestral accompaniment data to remotely designate the performance of the respective pieces of music by the recorded orchestral accompaniment device;

music selection means for selecting a particular item from among the plurality of music name data items stored in the first storage means;

output means for transmitting recorded orchestral accompaniment code data corresponding to the particular music name data item selected by the selection means toward a remote control receiver of the recorded orchestral accompaniment device;

second storage means for storing in a corresponding relationship data on the frequencies of transmission of the recorded orchestral accompaniment code data by the output means, those recorded orchestral accompaniment code data and the plurality of music name data stored in the first storage means; and retrieval means for sequentially retrieving the plurality of music name data stored in the first storage means in the order where the data on the frequencies of transmission of the recorded orchestral accompaniment code data stored in the second storage means decrease when the selection means selects the particular music name data item.

According to this arrangement, data on the frequency of transmission of each of a plurality of recorded orchestral accompaniment data stored in the first storage means is stored in the second storage means. The retrieval means retrieves the plurality of music name data on the basis of the data on the frequencies of transmission of the recorded orchestral accompaniment code data. The selection means selects a particular music name data item in accordance with the result of the retrieval. Thus, a remote control device convenient to use with a recorded orchestral accompaniment is provided in which popular pieces of music selected frequently are easily selected. In addition, since data on the frequencies of transmission of recorded orchestral accompaniment code data is stored in the second storage means, data on the frequency of singing of a song for each of pieces of music in the recorded orchestral accompaniment device is obtained and hence this control device is convenient for the training of song singing in the recorded orchestral accompaniment device.

In order to achieve the above objects, the present invention provides a remote control device for a plurality of devices, including:

input means for inputting to the remote control device remote control data on the plurality of devices;

device code storage means for storing remote control data on the plurality of devices input by the input means;

selection means for selecting a remote control data item on a particular device from among the remote control data on the plurality of devices stored in the device code storage means;

output means for transmitting the remote control data item on a particular device selected by the selection means toward a remote control receiver of the particular device;

output frequency counting means for counting the frequency of transmission of the remote control data item by the output means for each of the plurality of devices;

output frequency storage means for storing data on the frequencies of transmission of the remote control data counted by the output frequency counting means in correspondence to the remote control data on the plurality of devices stored in the device code storage means; and retrieval means for retrieving remote control data on the plurality of devices on the basis of the data on the frequencies of transmission of the remote control data stored in the count frequency storage means when the selection means selects a remote control data item on a particular one of the plurality of devices.

According to such arrangement, data on the frequency of transmission of each of remote control data on a plurality of devices stored in the device code storage means is stored in the output frequency storage means. The retrieval means retrieves remote control data on the plurality of devices on the basis of the data on the frequencies of transmission of the remote control data. The selection means selects remote control data on a particular device in accordance with the result of the retrieval. Thus, a learning remote control device is provided which is convenient to use and capable of easily selecting a one used very frequently from among electronic devices having a plurality of different functions.

DETAILED DESCRIPTION OF THE PREFERRED EMBODIMENTS

[First Embodiment] (FIGS. 1–8)

Figure 1:
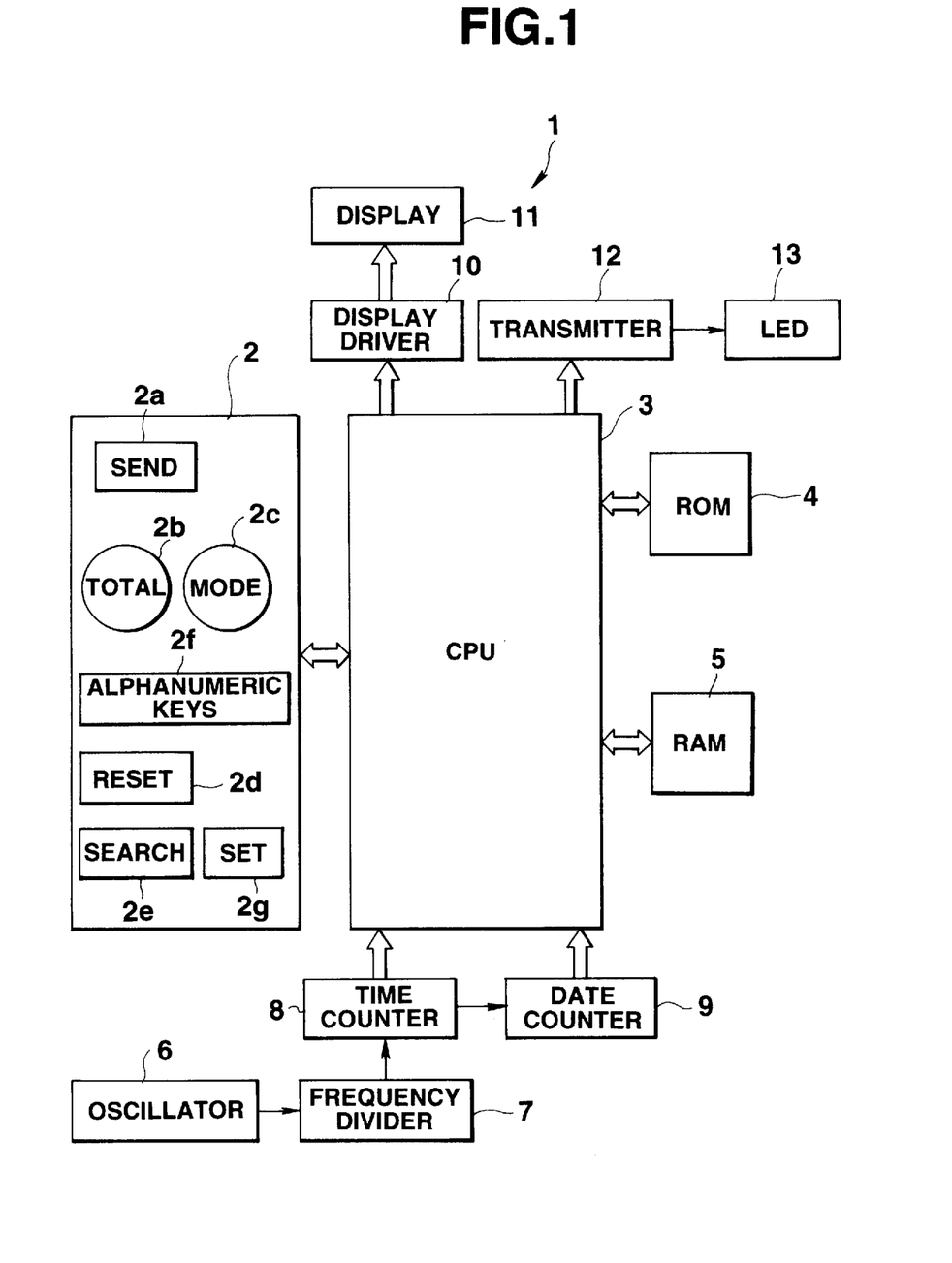
FIG. 1 is a circuit block diagram of a wrist watch type remote control system as a first embodiment of the present invention.

Structure:

A wrist watch type remote control device 1 of FIG. 1 as a first embodiment of the present invention composes a transmitter of a remote control system whereas a receiver which receives a signal from the transmitter is built in a recorded orchestral accompaniment device. The receiver is well known conventionally and not directly related to the features of the present invention, and further description thereof will be omitted.

Referring to FIG. 1, the wrist watch type remote control device 1 is composed of an input unit 2, a central processing unit (CPU) 3, a read only memory (ROM) 4, a random access memory (RAM) 5, an oscillator 6, a frequency divider 7, a time counter 8, a date counter 9, a display driver 10, a display 11, a transmitter 12; and a LED 13.

The input unit 2 includes a sending key 2a which instructs the transmission of recorded orchestral accompaniment code data provided for a piece of music to instruct the performance of a selected piece of music in the recorded orchestral accompaniment device in a remote control manner, a total key 2b for instructing the display of data T on the total of frequencies of transmission of recorded orchestral accompaniment data in any particular period of time, a mode key 2c for instructing selection between a timepiece display mode and a recorded orchestral accompaniment music selection mode, a reset key 2d for instructing the resetting of accumulated data in the RAM 5 involving the data T on the total of frequencies of transmission of respective recorded orchestral accompaniment data in any particular period of time, a search key 2e for instructing the retrieval of music name data, memory number data m and recorded orchestral accompaniment data for the respective pieces of music in the order in which the numerical values of the frequencies of transmission n of recorded orchestral accompaniment code data for the respective pieces of music decrease, alphanumeric keys 2f for keying in music name data and recorded orchestral accompaniment code data, etc., and a set key 2g for storing in the RAM 5 the data keyed in by the alphanumeric keys 2f. The input unit 2 outputs data keyed in by the respective keys 2a–2g to the CPU 3.

The CPU 3 controls the respective operations of the elements of the wrist watch type remote control device 1 in accordance with various control programs stored in the ROM 4. More specifically, the CPU 3 performs a timekeeping process and a display process to display the time and date data from the time counter 8 and the date counter 9 through the display driver 10 on the display 11. The CPU performs remote control operations in accordance with various remote control instruction signals from the input unit 2, outputs recorded orchestral accompaniment code data to the transmitter 12 to cause the LED 13 to emit light to send the receiver a recorded orchestral accompaniment code signal.

When the search key 2e is operated in a remote control process to be also described later, the CPU 3 retrieves music name data, memory number data m and recorded orchestral accompaniment code data in the order where the numerical values of the frequencies of transmission n of recorded orchestral accompaniment code data for the respective pieces of music stored and selected in the RAM 5 decrease on the basis of the frequencies of transmission n of the data, stores the music name data, memory number data m and recorded orchestral accompaniment code data in order of the result of the retrieval, and calculates and displays data T on the total of frequencies of transmission of the recorded orchestral accompaniment code data for the respective pieces of music in any particular period of time or in the period of time between adjacent operations of the reset key 2d.

The ROM 4 stores a timepiece process program, a display process program and a remote control process program which the CPU 3 executes.

Figure 2:
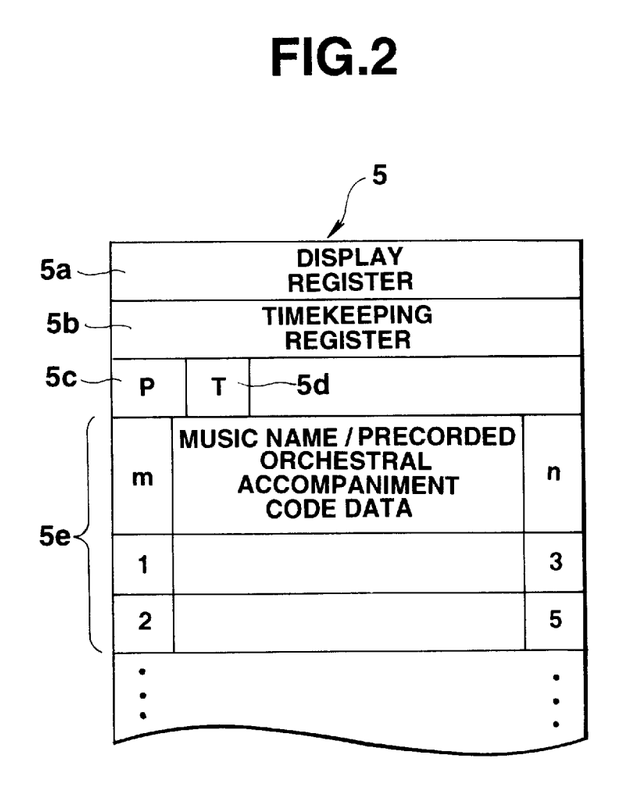
FIG. 2 is a schematic of a RAM of FIG. 1.

As shown in FIG. 2, the RAM 5 includes a display register 5a which stores display data, a timekeeping register 5b which stores time data, a mode register 5c which stores a mode flag P indicating that a remote control mode has been set, an accumulating register 5d which stores data T on the total of frequencies of transmission of recorded orchestral accompaniment code data for the respective pieces of music in any particular period of time, and a data register 5e which stores the memory number data m, music name data, recorded orchestral accompaniment code data and data on the frequency of transmission n of recorded orchestral accompaniment code data for a respective one of pieces of music in a mutually related manner.

It is to be noted that the frequency of transmission of recorded orchestral accompaniment code data for a respective one of pieces of music referred to herein is equivalent to the frequency of singing or selection of that piece of music in the recorded orchestral accompaniment device and can be replaced with same in the description.

When "1" is set in the mode flag P stored in the mode register 5c of the RAM 5, the mode flag indicates that the remote control mode is set whereas when "0" is set, the mode flag indicates that the remote control mode is not set or a timepiece mode is set.

The time counter 8 records the current time for hour, minute and second on the basis of a pulse signal having a constant cycle delivered through the frequency divider 7 from the oscillator 6 and outputs data on the current time to the CPU 3 and the date counter 9. The date counter records the current date for month, date and day of the week on the basis of data on the current time received from the time counter 8 and outputs data on the current date to the CPU 3.

The display driver 10 drives the display 11 on the basis of the display data processed and supplied by the CPU 3 in accordance with the key-in operation at the input unit 2 to display the time and the contents of the remote control operation on the display 11.

The transmitter 12 modulates an infrared ray with the recorded orchestral accompaniment code data read from the RAM 5 by the CPU 3 in accordance with the key-in operation signal from the input unit 2, amplifies the resulting data and emits an infrared ray involving the modulated and amplified recorded orchestral accompaniment data from the LED 13.

Operation:

The main process performed by the CPU 3 in the wrist watch type remote control device 1 of the first embodiment will be described with reference to the flowchart of FIG. 3.

Figure 3:
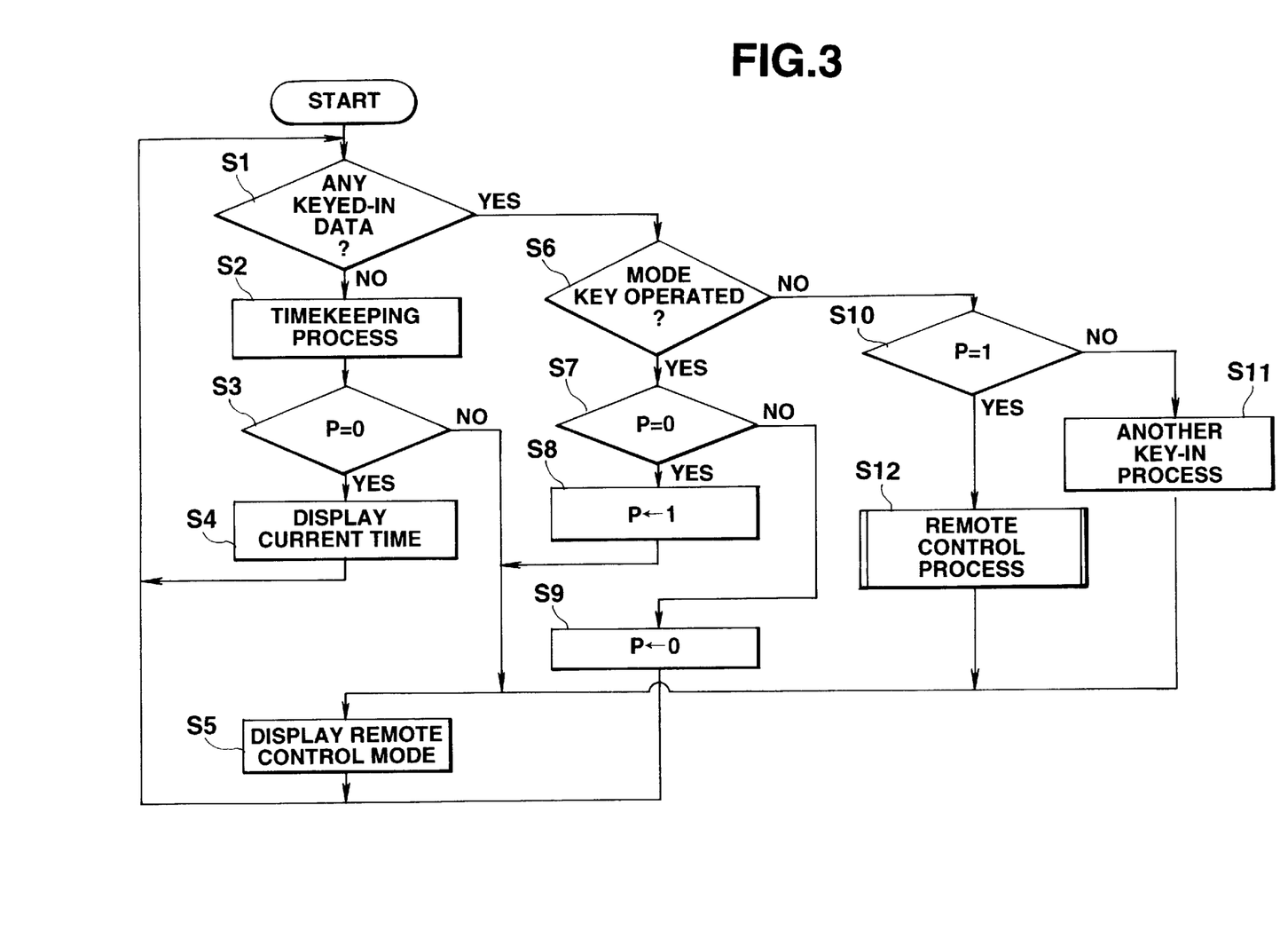
FIG. 3 is a flowchart indicative of a main process executed by a CPU of FIG. 1.

In FIG. 3, when a battery for the remote control device 1 is replaced with a new one and the supply of a drive voltage starts, the CPU 3 starts the main process. That is, first, the CPU 3 performs a halt process to check whether there is any keyed-in data from the input unit 2 (step S1). If not, the CPU 3 performs a timekeeping process of the time counter 8 and date counter 9 (step S2). The CPU 3 then determines whether the mode flag P stored in the mode register 5c of the RAM 5 is "0" (step S3). If so, the CPU 3 stores the time data and date data received sequentially from the time counter 8 and the date counter 9 in the timekeeping register 5b of the RAM 5, and displays the time and date data through the display driver 10 on the display 11 (step S4). The CPU 3 then returns to the halt process at step S1.

When "0" is not set, but "1" is set in the mode flag P at step S3, the CPU 3 displays a remote control mode on the display 11 (step S5) and then returns to the halt process at step S1.

If there is any keyed-in data in the halt state at step S1, the CPU 3 determines whether the keyed-in data is due to the operation of the mode key 2c (step S6).

If so, the CPU 3 determines whether "0" is set in the mode flag P (step S7). If so, the CPU 3 sets "1" in the mode flag P, displays the remote control mode on the display 11 (step S5), and then returns to the halt process at step (step S1). If "1" is set in the mode flag P at step S7, the CPU 3 sets "0" in the mode flag P (step S9) and then returns to the halt process at step S1.

If the mode key 2c has not been operated at step S6, the CPU 3 determines whether the mode flag P is set at "1" (step S10). If not, the CPU 3 performs another key-in process (step S11). If the mode flag P is set at "1", the CPU 3 performs a remote control process (step S12) to display its contents on the display 11 (step S5), and then returns to the halt process at step S1.

Figure 4:
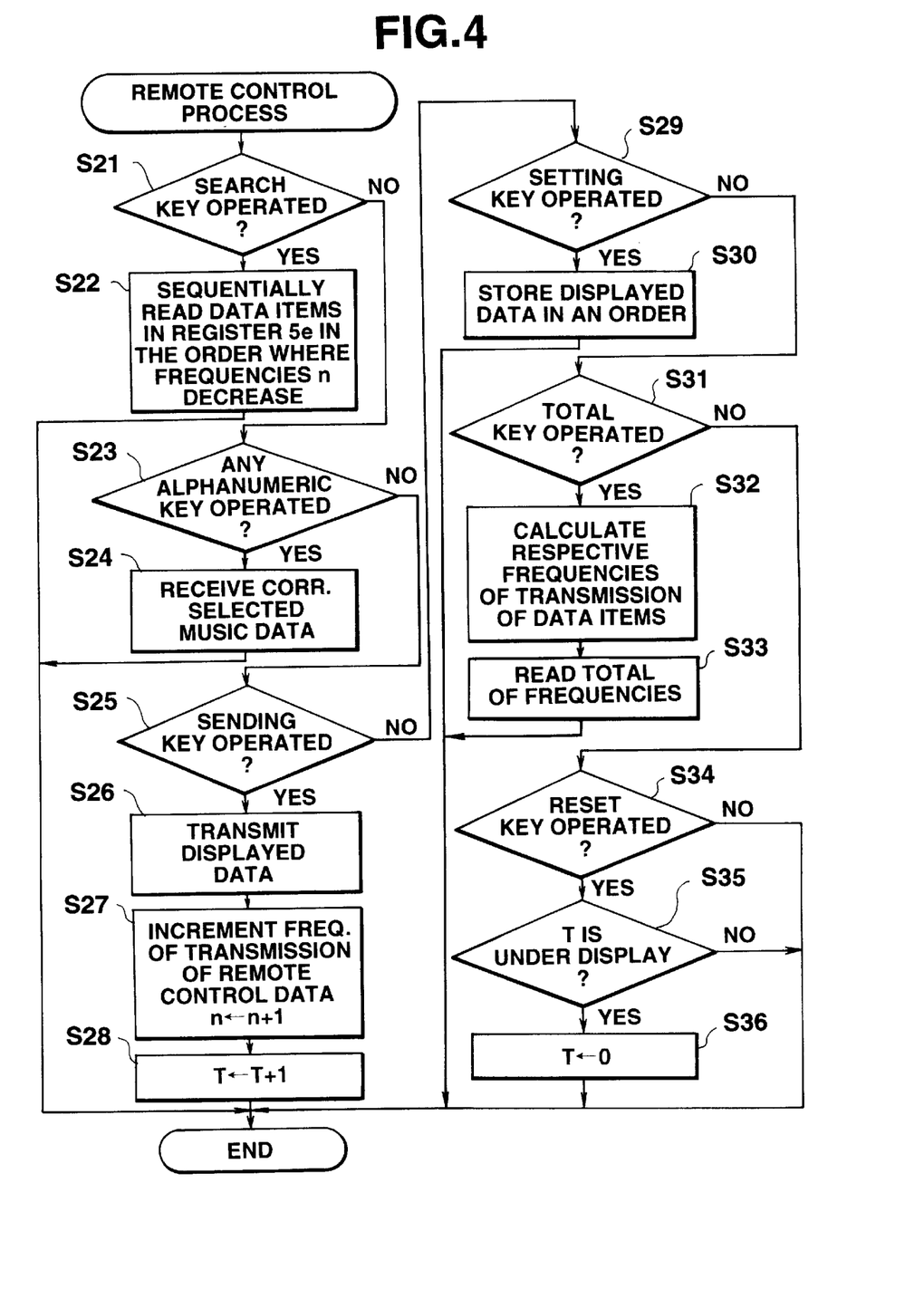
FIG. 4 is a flowchart indicative of a remote control process executed by the CPU of FIG. 1.
Figure 8:
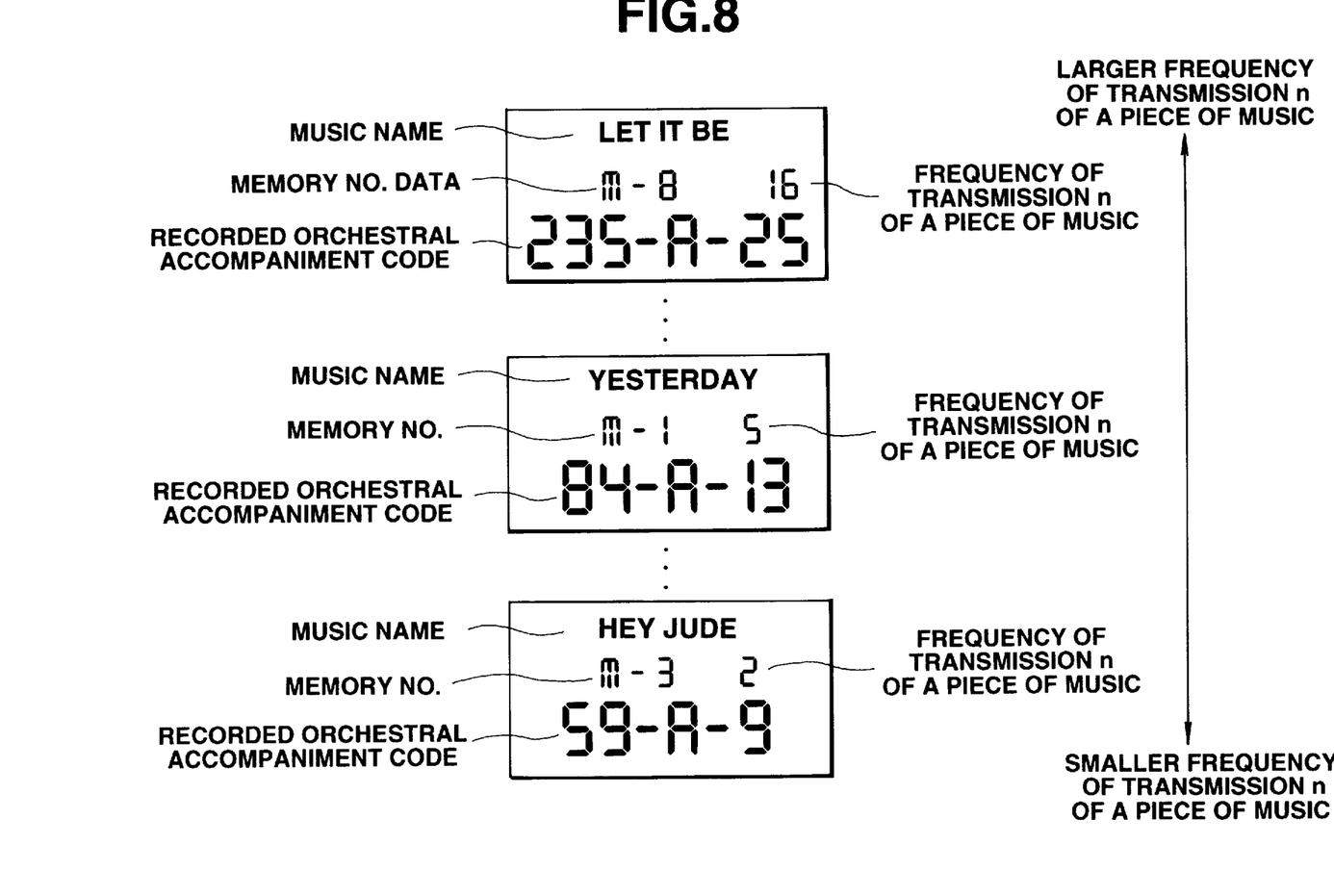
FIG. 8 shows three different illustrative displays appearing on the basis of the automatic sorting function in the order in which the frequencies of song singing in the wrist watch type remote control device as the first embodiment decrease.

The remote control process at step S12 will be described next with reference to the flowchart of FIG. 4. In FIG. 4, first, the CPU 3 determines whether the search key 2e has been operated at the input unit 2 (step S21). If so, the CPU 3 reads sequentially the recorded orchestral accompaniment code data for the pieces of music stored in the data register 5e of the RAM 5 in the order in which the respective numerical values of the frequencies of transmission n of recorded orchestral accompaniment code data for the pieces of music stored in the data register 5e of the RAM 5 decrease (step S22) and ends this process. Thereafter, the CPU 3 sequentially displays the music name data, memory number data m, recorded orchestral accompaniment code data, and data on the frequency of transmission n of recorded orchestral accompaniment code data for respective pieces of music in the order in which the respective read numerical values of the frequencies of transmission n of recorded orchestral accompaniment code data for the pieces of music decrease in the display process at step S5 of the main process. As shown in FIG. 8, the display 11 can only display a group of such data. Each time the search key 2e is operated, the CPU 3 displays on the display 11 a further group of such data including music name data, etc., having the next maximum frequency of transmission n of recorded orchestral accompaniment code data.

When at step S21 the search key 2e has not been operated, the CPU 3 determines whether the alphanumeric keys 2f has been operated (step S23). If so, the CPU 3 receives music selection data including music name data, recorded orchestral accompaniment data, etc., based on the operation of that key (step S24) and ends this process. Thereafter, the CPU 3 displays the keyed-in music selection data at step S5 in the main process on the display 11.

If no alphanumeric keys 2f have been operated at step S23, the CPU 3 determines whether the sending key 2a has been operated (step S25). If so, a piece of music indicated by its name data is selected and the transmitter 12 causes the LED 13 to emit light involving the recorded orchestral accompaniment code data for the selected piece of music toward the remotely controlled receiver of the recorded orchestral accompaniment device (step S26). Simultaneously, the CPU 3 increments by one the frequency of transmission of recorded orchestral accompaniment code data in the data register 5e of the RAM 5 corresponding to the recorded orchestral accompaniment code data transmitted by the transmitter 12 (step S27). The CPU 3 then increments by one the total of frequencies of transmission of recorded orchestral accompaniment code data stored in the accumulating register 5d of the RAM 5 (step S28) and ends this process. Thereafter, the CPU 3 displays the data T on the total of frequencies of transmission of recorded orchestral accompaniment data on the display 11 in the display process at step S5.

If the sending key 25 has not been operated at step S25, the CPU 3 determines whether the setting key 2g has been operated (step S29). If so, the CPU 3 stores the keyed-in data including the recorded orchestral accompaniment data displayed on the display 11 in the key-in process at step S24 in the data register 5e of the RAM 5 (step S30) and ends this process.

If the setting key 2g has not been operated at step S29, the CPU 3 determines whether the total key 2b has been operated (step S31). If so, the CPU 3 calculates and reads data on the total of frequencies n of transmission of recorded orchestral accompaniment code data for the respective pieces of music stored in the data register 5e (step S32). The CPU 3 then reads data T on the total of frequencies n of transmission of the recorded orchestral accompaniment code data stored in the accumulating register 5d (step S33) and ends this process. Thereafter, in the display process at step S5, the CPU 3 displays on the display 11 the read data on the total of frequencies n of transmission of recorded orchestral accompaniment code data in the past and data T on the total of frequencies of transmission of recorded orchestral accompaniment code data in any particular period of time.

When the total key 2b has not been operated at step S31, the CPU 3 determines whether the reset key 2d has been operated (step S34). If so, the CPU 3 determines whether the data T on the total of frequencies of transmission of recorded orchestral accompaniment code data is under display on the display 11 (step S35). If not, the CPU 3 ends this process. If the data T is under display, the CPU 3 sets the data T at "0" (step S36), and ends this process. Thereafter, in the display process at step S5, the CPU 3 displays on the display 11 data T on the total of frequencies of transmission of recorded orchestral accompaniment data as being "0".

Figure 5:
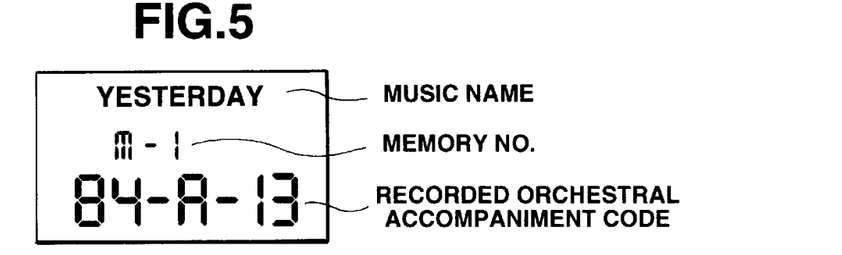
FIG. 5 shows an illustrative display based on a recorded orchestral accompaniment memory function of the wrist watch type remote control device as the first embodiment.

FIGS. 5–8 illustratively show data displayed on the display 11 in the remote control process. FIG. 5 shows the recorded orchestral accompaniment memory function illustratively, that is, that memory number data m for a piece of music, recorded orchestral accompaniment code data and music name data "YESTERDAY" stored in the data register 5e of the RAM 5 in the transmission of the selected music data are displayed on the display 11 with the recorded orchestral accompaniment code data "84-A-13" being stored in a memory number "m–1" of the data register 5e.

Figure 6:
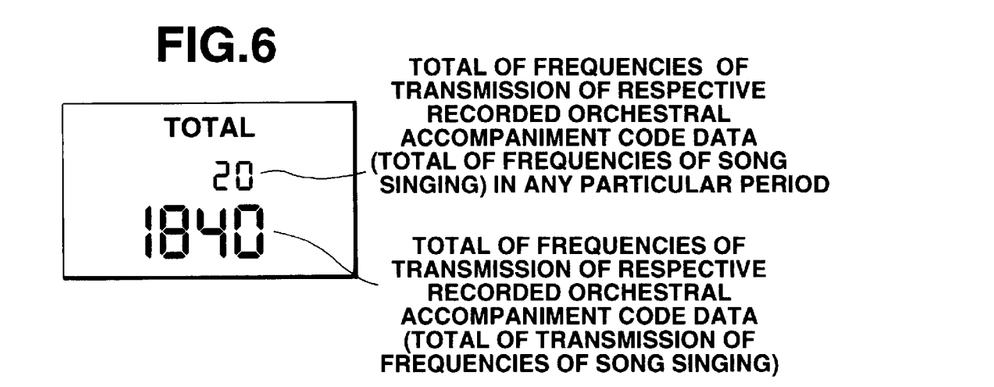
FIG. 6 shows an illustrative display of two different data based on the function of counting the frequency of song singing in the wrist watch type remote control device as the first embodiment.

FIG. 6 shows an illustrative display of the frequency of transmission of recorded orchestral accompaniment code data or an illustrative display of the function of counting the frequency of song singing. In FIG. 6, data T ("20") on the total of frequencies of transmission of recorded orchestral accompaniment code data in any particular period of time stored in the accumulating register 5d of the RAM 5 and incremented each time a piece of music is selected and the total of the frequencies of transmission n of the respective pieces of music (displayed as "1840") in the past.

Figure 7:
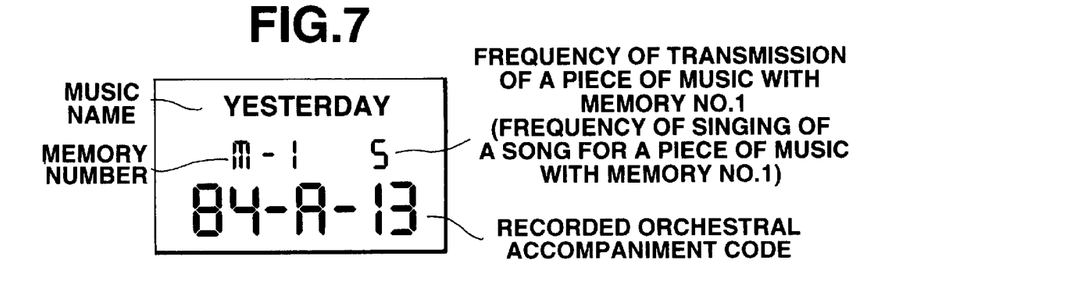
FIG. 7 shows an illustrative display of three different data based on the function of counting the frequency of song singing in a memory of the wrist watch type remote control device as the first embodiment.

FIG. 7 shows an illustrative display of the function of counting the frequency of transmission of recorded orchestral accompaniment code data in the RAM 5, i.e., the frequency of song singing in the RAM 5.

FIG. 7 shows an illustrative display of data on the frequency of transmission n of a selected piece of music incremented in the data register 5e of the RAM 5 when the data on the selected piece of music is transmitted. In FIG. 7, music name "YESTERDAY", memory number "m−1", the frequency of transmission "5" of the piece of music for that music name, and recorded orchestral accompaniment code "84-A-13" are displayed.

FIG. 8 shows an illustrated function of automatically sorting and displaying data on the respective pieces of music stored in the data register 5e of the RAM 5 in the order in which the frequencies of transmission n of the respective pieces of music decrease.

As described above, in the wrist watch type remote control device 1 of the present embodiment, data on the frequency of transmission n of recorded orchestral accompaniment code data for each of the pieces of music selected by the recorded orchestral accompaniment system is accumulated and stored on the basis of the transmission of the recorded orchestral accompaniment code data for that piece of music, and music name data and recorded orchestral accompaniment code data are read and displayed sequentially in the order in which the frequencies of transmission n of the recorded orchestral accompaniment code data decrease.

Thus, the user of the recorded orchestral accompaniment system is able to call a piece of music which he wants to sing immediately when he desires, that is, to improve the operability of the remote control device in the selection of a piece of music. Since the frequency of song singing or the frequency of transmission of recorded orchestral accompaniment code data is displayed, the history of that piece of music and the frequency of singing of that song in the past are understood. By indication of the frequency of song singing or the frequency of transmission of recorded orchestral accompaniment code stored in the RAM 5, the user can know the degree of training of a subject song which a group of singers sings, attachment to that song, the importance of the frequency of song singing, etc.

As a result, the present remote control device provides not only the sole function of selecting a piece of music in a recorded orchestral accompaniment system, etc., but also another function of retrieving a frequently sung popular piece of music in order of frequency to thereby increase user's interest and improve the operability and utility thereof.

While in the embodiment the inventive remote control device has been illustrated as taking the form of a wrist watch, the present invention is not limited to the particular case, but is applicable to music selection remote control devices used in the conventional recorded orchestral accompaniment systems.

[Second Embodiment] (FIGS. 9–13)

Figure 9:
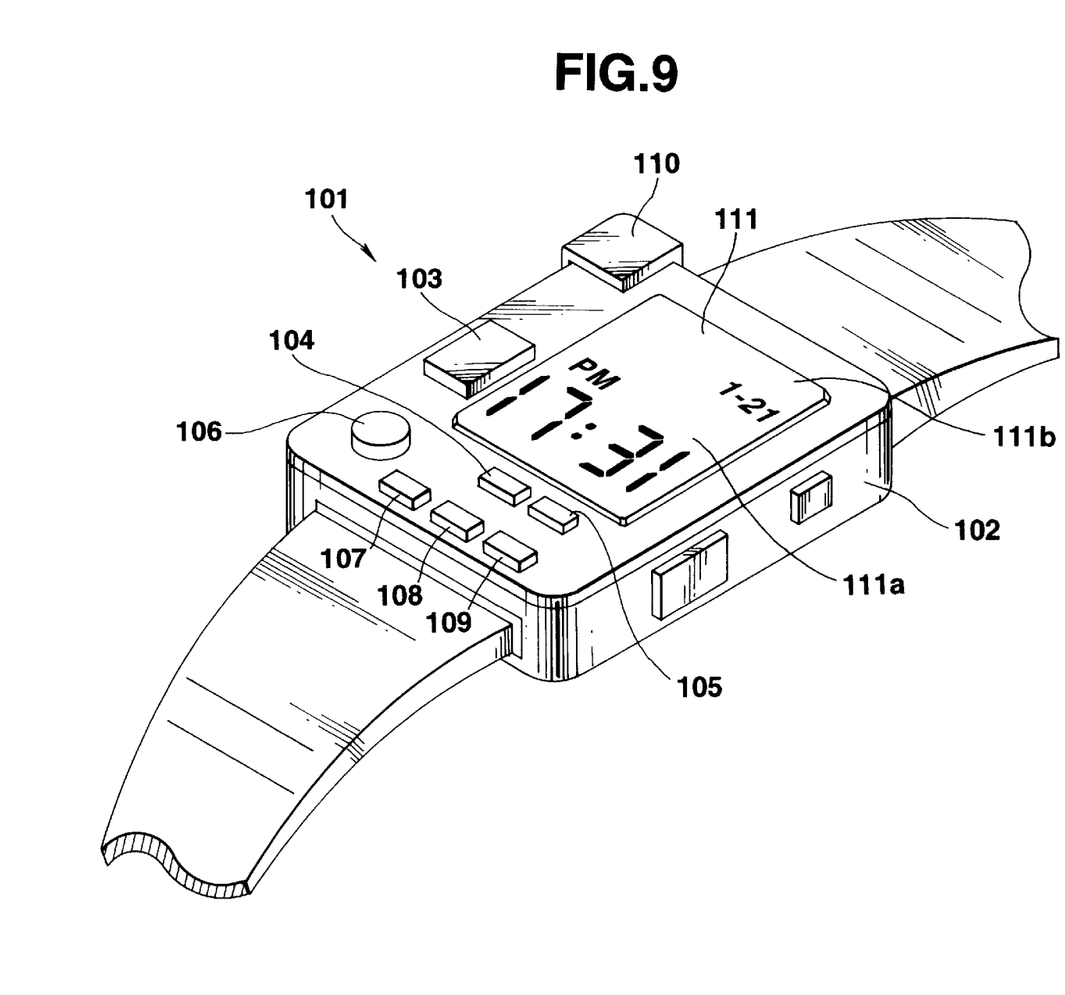
FIG. 9 is a perspective view of a wrist watch type remote control device as a second embodiment of the present invention.

Structure:

FIG. 9 is a perspective view of a second embodiment of a wrist watch to which a remote control device according to the present invention is applied. In FIG. 9, the wrist watch 101 includes on an upper surface of a case 102 a power key 103 which turns on/off a power supply for an electronic device such as a television set or a video tape recorder; a volume adjustment up key 104; a volume adjustment down key 105; a channel key 106 which selects a television channel; a retrieval key 107 which retrieves a remote control code for remote control of an electronic device; a mode key 108 which selects a mode (remote control operation mode/ remote control learning mode) in which the electronic device is operated remotely; a remote control number key 109 which selects the remote control number of an electronic device which learns remote control code data; an LED 110 which emits light involving each of various remote control signals; and a display 111 composed of a liquid crystal display panel which displays the time 111a and the contents of the remote control operation 111b.

Figure 10:
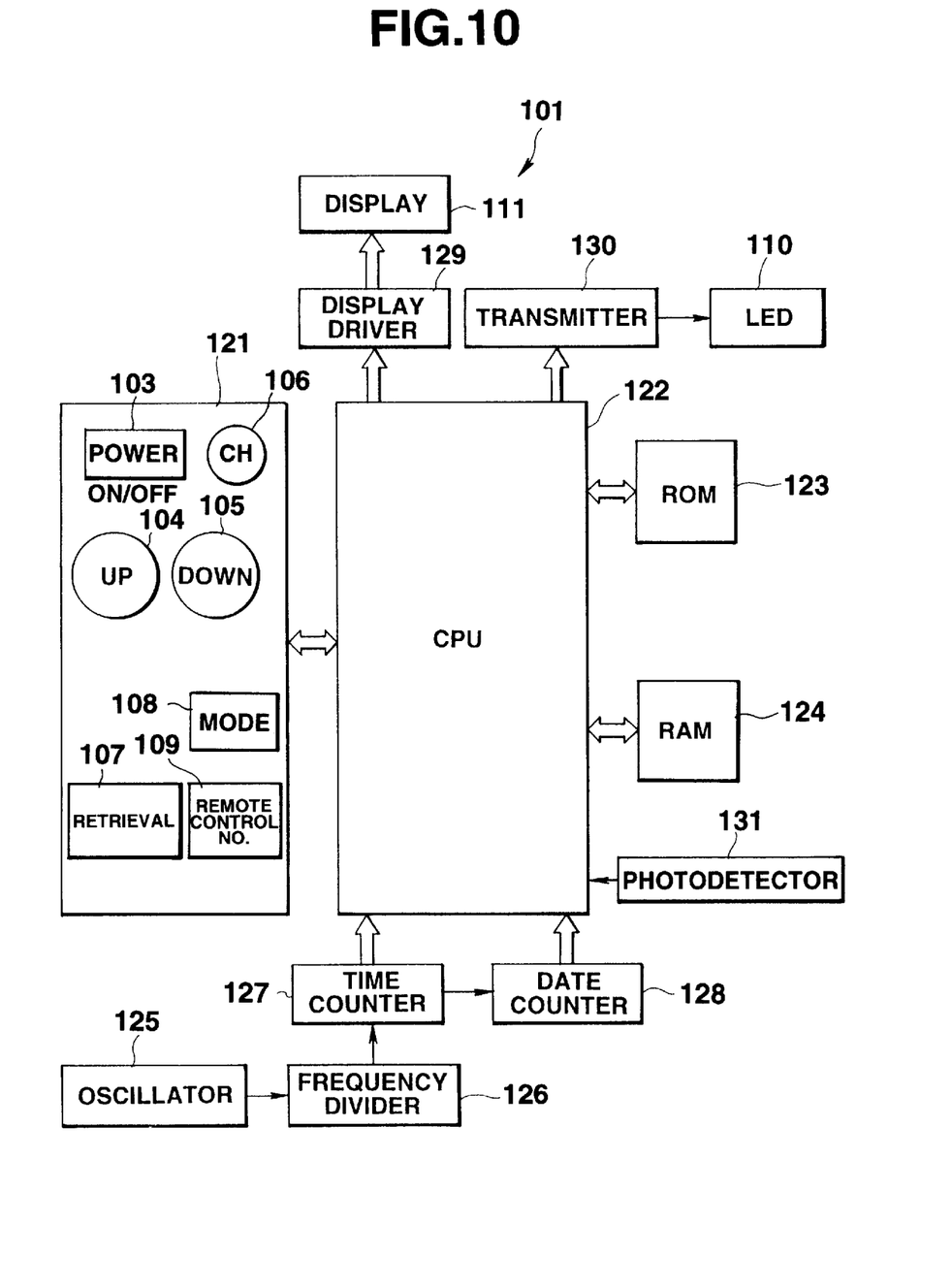
FIG. 10 is a circuit block diagram of the wrist watch type control device of FIG. 9.

FIG. 10 is a block diagram of the system of the wrist watch 101 of FIG. 9. The same element is identified by the same reference numeral in FIGS. 9 and 10.

In FIG. 10, the wrist watch 101 is composed of an input unit 121, a CPU 122, a ROM 123, a RAM 124, an oscillator 125, a frequency divider 126, a time counter 127, a date counter 128, a display driver 129, the display 111, a transmitter 130, the LED 110 and a photodetector 131.

The input unit 121 is composed of the power key 103, up key 104, down key 105, channel key 106, retrieval key 107, mode key 108 and remote control number key 109 of FIG. 9. The input unit 121 outputs various remote control instruction signals generated by the respective key-in operations to the CPU 122.

The CPU 122 controls the respective operations of the elements of the wrist watch 101 in accordance with various control programs stored in the ROM 123. More specifically, the CPU 122 performs a timekeeping process and a display process to output time and date data from the time counter 127 and the date counter 128 through the display driver 129 to the display 111 for displaying purposes. The CPU 122 also performs a remote control process in accordance with a respective one of various remote control instruction signals from the input unit 121, outputs the corresponding remote control data to the transmitter 130 to cause the LED 110 to emit light involving the remote control code signal. When the photodetector 131 receives a remote control data signal involved in the light emitted by a genuine remote control device annexed to an electronic device, the CPU 122 stores the remote control data signal for that electronic device.

Each time a remote control number is selected and sent as number data in a remote control process to be describe later, the CPU 122 counts the frequency of transmission or use S of the remote control number and stores same in the RAM 124. When the retrieval key 107 is operated, the CPU 122 reads from a data memory 124c of the RAM 124 data on a remote control number having the maximum frequency of use S and sets it in an A register 124e of the RAM 124 such that a television set, or a video tape recorder, having the maximum frequency of use S is remotely controlled immediately.

The ROM 123 stores the timekeeping process program, display process program and remote control process program performed by the CPU 122.

Figure 11:
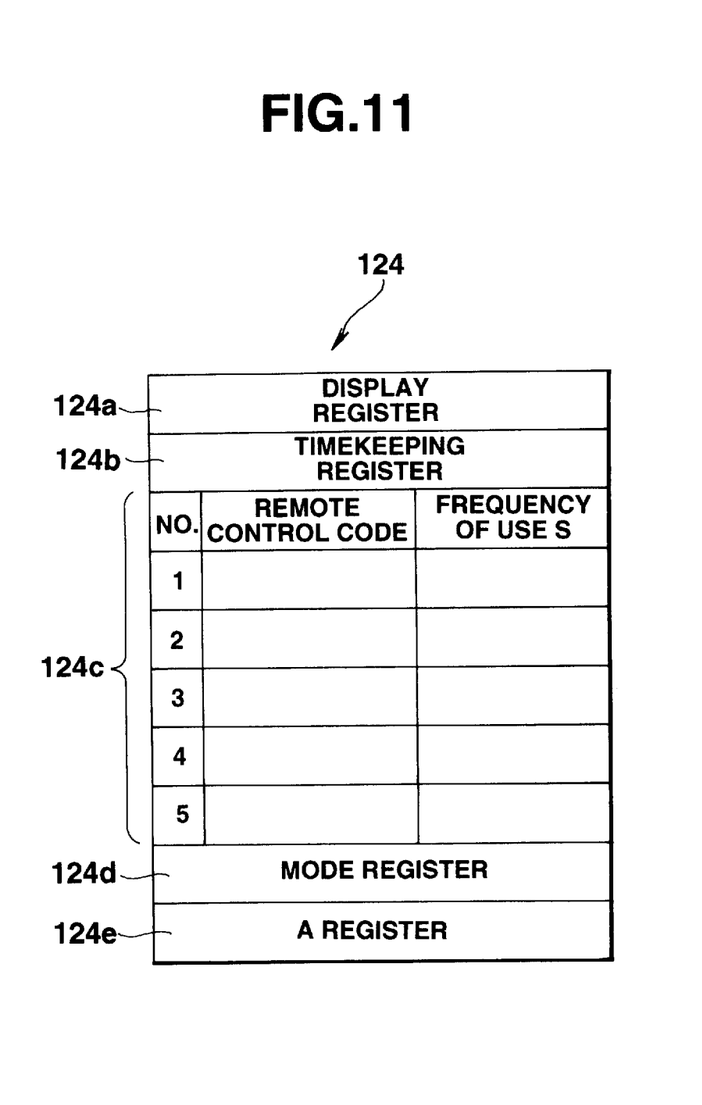
FIG. 11 is a schematic of a RAM of FIG. 10.

As shown in FIG. 11, the RAM 124 is composed of a display register 124a which stores display data, a timekeeping register 124b which stores time data, the data memory 124c which stores remote control code data for five electronic devices of television sets and video tape recorders and the corresponding frequencies of use S of the remote control number data, and a mode register 124d which stores a mode flag M indicative of a set remote control mode. When "1" is set in the mode flag M of the mode register 124d, the mode flag M indicates that a remote control mode is set whereas when "0" is set, the mode flag M indicates that the remote control mode is not set. As mentioned above, the A register 124e stores remote control data read by the CPU 122 from the data memory 124 in the order in which the frequencies of use S of remote control code data decrease.

The RAM 124 stores a plurality of remote control code data on power supply on/off control, volume control and channel control of one television set or video tape recorder for each remote control number. Thus, the RAM 124 stores remote control code data required for remote control of five electronic devices of television sets and video tape recorders.

The time counter 127 records the current time for hour, minute and second on the basis of a pulse signal having a constant cycle delivered through the frequency divider 126 from the oscillator 125, and outputs the time data to the CPU 122 and the date counter 128.

The date counter 128 records the current date for month, day, and day of the week on the basis of the time data delivered from the time counter 127 and outputs the date data to the CPU 122.

The display driver 129 drives the display 111 in accordance with display data processed and delivered by the CPU 122 in accordance with the key-in operation at the input unit 121 to display the time 111a and the contents of the remote control operation 111b, as shown in FIG. 9.

The transmitter 130 modulates an infrared ray with remote control code data read from the RAM 124 by the CPU 122 in accordance with a key-in signal from the input unit 121, amplifies the modulated data, and causes the LED 119 to emit light involving the amplified and modulated data, as well known.

The photodetector 131 detects a remote control data signal from the genuine remote control device annexed to the electronic device and converts the signal to remote control data and outputs same to the CPU 122.

Operation:

The main process performed by the CPU 122 in the wrist watch 101 of the second embodiment will be described next with reference to a flowchart of FIG. 12.

Figure 12:
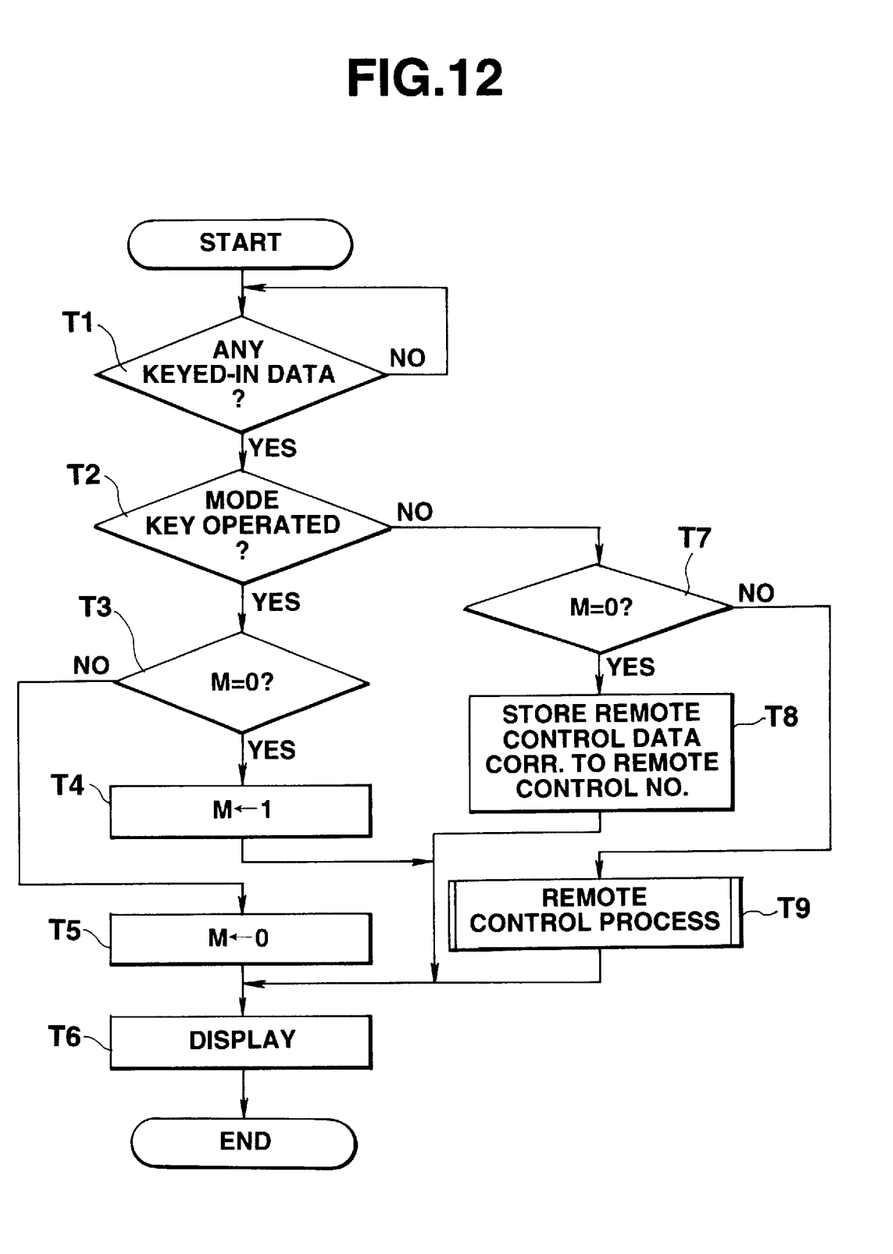
FIG. 12 is a flowchart indicative of a main process executed by a CPU of FIG. 10.

In FIG. 12, first, the CPU 122 determines at step T1 whether there is any keyed-in data. If so, the CPU 122 determines whether the keyed-in data is due to the operation of the mode key 108 (step T5). If so, the CPU 122 checks whether the mode flag M in the mode register 124d of the RAM 124 is set at "0" (step T3). In the remote control mode, the mode flag M is set at "1" whereas if not, the remote control flag is set at "0". If the mode flag is set at "0", the CPU 122 sets the mode flag M at "1" (step T4) and displays on the display 110 that the remote control mode is set (at step T6).

When the mode flag M is not set at "0", or is set at "1" at step T3, the CPU 122 sets the mode flag M at "0" (step T5) to release the remote control mode to thereby erase the indication of the remote control mode on the display 111 in the display process at step T6.

When the mode key 108 has not been operated at step T2, the CPU 122 checks whether the mode flag M is set at "0" (step T7). If so, the CPU 122 stores remote control data from the photodetector 131 in the data memory of the RAM 124 corresponding to the remote control number selected by the operation of the remote control number key 109 (step T8). In the process at step T8, the CPU 122 performs a learning process in which the photodetector 131 detects a remote control signal, emitted by the remote control device annexed to the television set or video tape recorder, at the position opposite to the television set or video tape recorder and converts the remote control signal to the remote control data and stores it as learning data in the data memory 124c of the RAM 124. The contents of the learning process are displayed on the display 111 in the display process at step T6.

When the mode flag M is not set at "0" at step T7, or when the mode flag M is set at "1" involving the remote control mode, the CPU 122 performs a remote control process (step T9) to perform a display process at step T6 in accordance with the contents of the remote control operation.

Figure 13:
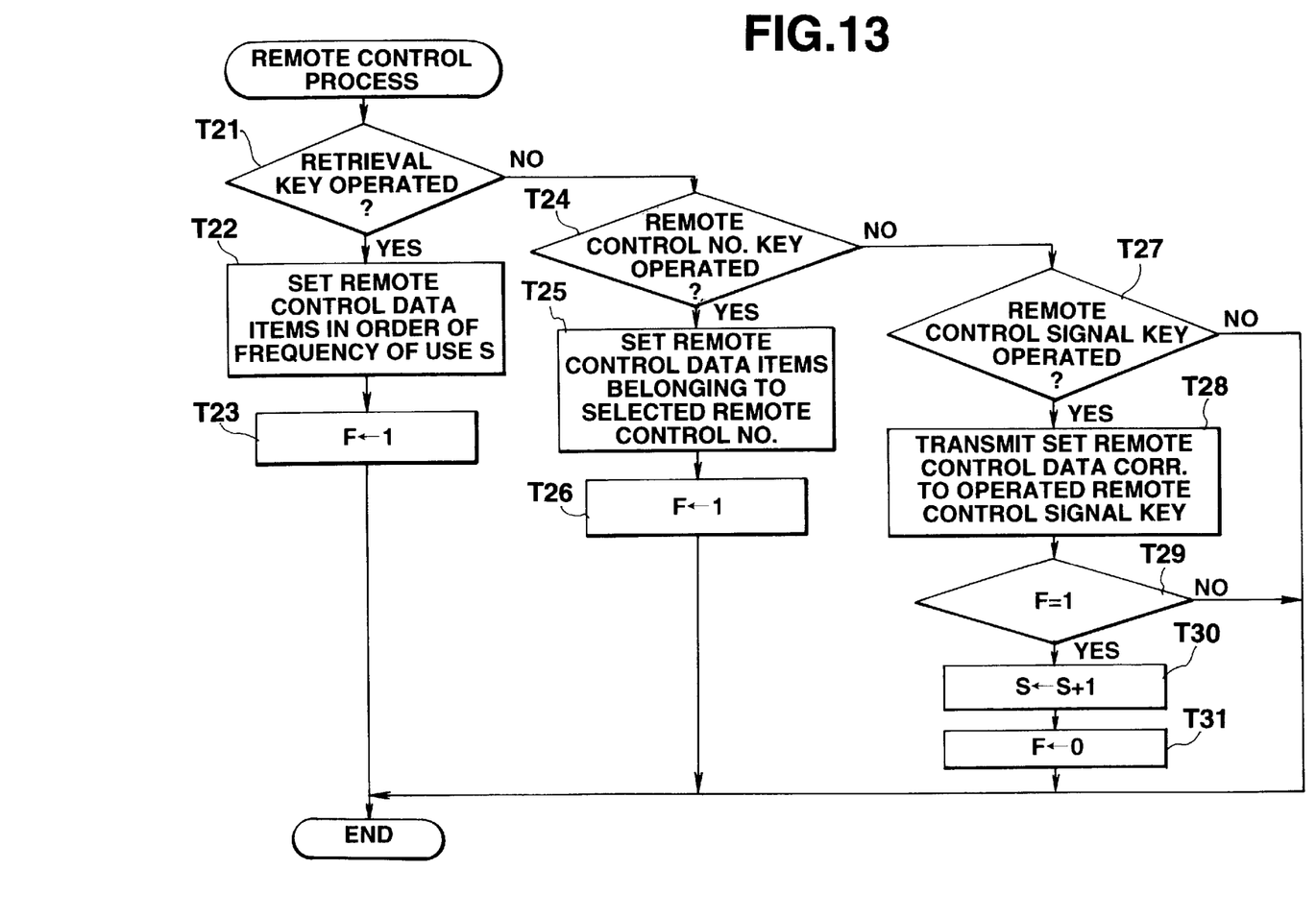
FIG. 13 is a flowchart indicative of a remote control process executed by the CPU of FIG. 10.

The remote control process at step T9 will be described next with reference to the flowchart of FIG. 13. In FIG. 13, the CPU 122 first determines whether the retrieval key 107 has been operated at the input unit 121 (step T21). If so, the CPU 122 reads a plurality of different remote control data (for example, for power on/off control, volume control and channel control, etc.,) belonging to the remote control number having the maximum frequency of use S stored in the data memory 124c of the RAM 124 on the basis of that frequency of use S and sets the read plurality of remote control data in the RAM 124e (step T22). Each time the retrieval key 107 is operated, the CPU 122 reads from the data memory 124c of the RAM 124 a plurality of different remote control data items belonging to a remote control number having the next maximum frequency of use S and sets that plurality of read data in the A register 124e. The CPU 122 then sets "1" in the flag F to indicate the setting of the plurality of remote control data items.

When the retrieval key 107 has not been operated at step T21, the CPU 122 determines whether the remote control number key 109 has been operated (step T24). If so, the CPU 122 reads the plurality of remote control data belonging to the selected remote control number from the data memory 124c of the RAM 124 and sets the plurality of remote control data in the A register 124c of the RAM 124 (step T25), and sets the flag F at "1" indicating that the remote control data has been set in the A register 124e and ends the present process (step T26). Each time a remote control number key is operated, the CPU 122 performs the process at steps T25 and T26.

When the remote control number key 109 has not been operated at step T24, the CPU 122 determines whether the remote control signal key or volume up/down keys 104, 105 or the channel key 106 has been operated (step T27). If so, the CPU 122 reads remote control code data corresponding to the operated remote control signal key from among a plurality of remote control code data involving the remote control of a particular electronic device set beforehand in the A register 124e of the RAM 124 in the process at step T22 or T25, outputs the read remote control code data to the transmitter 130, and causes the LED 110 to emit light involving the read remote control code data (step T28).

The CPU 122 then determines whether the flag F is set at "1" (step T29). If not, the CPU 122 ends the present process. If the flag F is set at "1", the CPU 122 increments data on the frequency of use S corresponding to the remote control number involving the remote control operation performed this time by one (S←S+1) (step T30), and sets the flag F at "0" to end the present process (step T31).

In summary, in the above remote control process for the wrist watch 101 of the present embodiment, the CPU 122 counts the frequency of use S for each remote control number. When the retrieval key 107 is operated, the CPU 122 reads and sets remote control data indicated by a remote control number having the maximum frequency of use S, so that the remote control operation of the television set or video tape recorder having the maximum frequency of use S is performed immediately to thereby improve the operability of the remote control function.

While in the second embodiment application of the inventive remote control device to the wrist watch has been illustrated, the present invention is not limited to that particular case. The present invention is applicable to the conventional learning remote control devices to improve its operability.

What is claimed is:

1. A remote control device for controlling a controllable object remotely, comprising:

a first electronic memory in which a plurality of remote control data for controlling the controllable object remotely and a plurality of identification data to identify the respective ones of the plurality of remote control data are pre-stored in corresponding relationship;

output means for outputting and transmitting the plurality of remote control data stored in said first electronic memory toward a remote control receiver of the controllable object;

a second electronic memory which stores a plurality of count data in correspondence with said plurality of remote control data, each of said plurality of count data representing the number of times a respective one of the plurality of remote control data has been transmitted by said output means;

a first manual operation key;

selection means responsive to sequential operations of said first manual operation key for selecting said plurality of remote control data stored in said first electronic memory in decreasing order of said corresponding count data stored in said second electronic memory;

a display control unit, including a display having a display area for displaying only one of said identification data at a time, and for sequentially displaying said identification data in decreasing order of said corresponding count data in response to said selection of said remote control data by said selection means;

a second manual operation key; and output control means responsive to said second manual operation key for controlling said output means to output and transmit the remote control data corresponding to the identification data displayed on said display toward the remote control receiver of the controllable object.

2. The remote control device according to claim 1, wherein said display control unit comprises means for displaying identification data for the remote control data selected by said selection means, and for displaying the count data corresponding to the selected remote control data.

3. The remote control device according to claim 1, further comprising:

summation means for summing the plurality of count data stored in said second electronic memory; and a second display which displays a sum of the plurality of count data summed by said summation means.

4. The remote control device according to claim 1, wherein said controllable object comprises a recorded orchestral accompaniment;

the remote control data selects a music name; and the identification data comprises a music name selected with the remote control data.

5. The remote control device according to claim 1, wherein said first electronic memory pre-stores a plurality of remote control data for controlling each of a plurality of different controllable objects remotely, and a plurality of identification data each of which identifies a respective one of the plurality of remote control data, in corresponding relationship.

6. The remote control device according to claim 1, further comprising:

receiving means for receiving remote control data externally;

identification data corresponding means for placing the remote control data received by said receiving means and identification data to identify the remote control data in corresponding relationship; and said first electronic memory pre-stores the remote control data received by said receiving means and the identification data placed in corresponding relationship by said identification data corresponding means.

7. The remote control device according to claim 1, wherein the remote control device comprises a wristwatch wearable on a wrist.

8. The remote control device according to claim 1, wherein said first and second electronic memories are different areas allocated in one electronic memory device.

9. The remote control device according to claim 1 wherein the remote control device is portable.

* * * * *